(12) United States Patent
Li et al.

(10) Patent No.: US 6,396,051 B1
(45) Date of Patent: May 28, 2002

(54) HIGH RESOLUTION OPTICAL PERFORMANCE MONITOR FOR DWDM SYSTEM

(75) Inventors: Jinghui Li, North Billerica; Eric Swanson, Acton; John Zyskind, Concord, all of MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/589,942

(22) Filed: Jun. 7, 2000

(51) Int. Cl.[7] .................................................. G01J 4/00
(52) U.S. Cl. ................................. 250/227.18; 359/110
(58) Field of Search ........................ 250/227.18, 227.23; 359/110, 590; 356/450

(56) References Cited

U.S. PATENT DOCUMENTS

| | | | | |
|---|---|---|---|---|
| 5,446,812 A | * | 8/1995 | Hirst | ............................ 385/24 |
| 5,986,782 A | | 11/1999 | Alexander et al. | ........... 359/110 |
| 6,097,487 A | * | 8/2000 | Kringlebotn et al. | ....... 356/450 |
| 6,103,535 A | * | 8/2000 | Pilevar et al. | .............. 436/518 |

\* cited by examiner

*Primary Examiner*—Que T. Le
*Assistant Examiner*—Thanh X. Luu
(74) *Attorney, Agent, or Firm*—Weingarten, Schurgin, Gagnebin & Lebovici LLP

(57) ABSTRACT

An apparatus for measuring the optical-signal-to-noise ratio (OSNR) of an optical system is adapted to function in single channel or in multi-channel wavelength division multiplexed optical communication systems. An optical signal spectrum and a center frequency characterize the optical signals. A narrow-band notch filter, realized by an in-fiber Bragg grating, is utilized to remove a component of the signal so the remaining signal can be measured. When multiple channels are present, a bandpass filter is used to select the part of the multiplexed signal to be measured. Both the narrow-band notch filter and the bandpass filter can be tunable to further extend the capabilities of the system. Two detectors are utilized with the power in the channel being measured by a low-gain detector and the power in the noise being measured by a high-gain detector. A processor receives the detector outputs, calculates OSNR, and controls the tunable components.

28 Claims, 13 Drawing Sheets

HIGH RESOLUTION OPTICAL PERFORMANCE MONITOR FOR DWDM SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to performance monitoring of optical networks and specifically to high resolution optical performance monitoring in wavelength division multiplexed systems.

Wavelength Division Multiplexing (WDM) is a technique for using an optical fiber to carry many separate and independent optical channels. Each channel is carried by a wavelength of light. The wavelengths between channels do not carry information but usually carry some noise. Dense WDM (DWDM) refers to the close spacing of the wavelengths carrying the channels. Current DWDM systems carry up to 160 channels spaced as closely as 50 Ghz apart with a channel power as low as −30 dBm before an Erbium-Doped Fiber Amplifier (EDFA). As the volume of INTERNET and other data communications traffic has increased, DWDM systems have become more in demand because of their high data carrying capacity.

The Bit-Error-Rate (BER) of an optical channel depends on four factors, the optical power level, non-linear optical distortion, electrical noise and distortion and the Optical-Signal-to-Noise-Ratio (OSNR). OSNR and the channel power are affected by an accumulation of factors including insertion loss, polarization dependent loss, and amplifier gain of the various in-line components in the system. OSNR is one of the most important parameters determining DWDM system performance because of its dominance in determining BER. Two DWDM channels having the same optical power but different OSNR have a significant difference in BER. Consequently, OSNR is typically monitored at each receiver site in a DWDM system and the OSNR information is used to optimize performance.

An additional reason to monitor OSNR in a DWDM system is the use of Optical-Add/Drop-Multiplexors (OADM). These can inject a new signal onto an unused channel of the DWDM signal or swap a new signal for an old signal in a utilized channel. When the OADM drops a signal, it drops the noise associated with that signal, reducing the noise level of the overall multiplexed signal. In addition, the signal added may have a very different power and noise level from the signal dropped. A change in the power of a channel can degrade the OSNR of other channels and the substitute wavelength may not have the needed OSNR to carry traffic if injected into routes that do not have sufficient safety margin. Each of these difficulties can be compensated for if the OSNR characteristics are measured and used to assure that the appropriate power levels are supplied.

One difficulty in OSNR measurement in any optical system is the narrowness of the optical channel linewidth (span of wavelengths used to carry information), requiring a very high resolution filter to distinguish the channel from the noise level. Conventional Optical Performance Monitors (OPM) have limited resolution when used in current systems, and thus can yield inaccurate OSNR measurement results and suboptimum performance of the DWDM system. In a DWDM signal, there is a noise floor above the zero power level and a set of channel powers at regular wavelength intervals. The OSNR for a signal channel is the ratio between the signal channel power and the noise power as expressed in Equation 1.

$$OSNR\,(\mathrm{dB}) = 10 \log\left(\frac{P_{signal}}{P_{noise}}\right) \qquad \text{Eq. 1}$$

If the power measurement for either the channel or noise floor is incorrect, the measured OSNR will not be correct. Conventional OPMs do not measure the noise floor with sufficient resolution to provide correct readings.

Current detector circuits cannot measure the noise floor limit causing current OPMs to fail to measure OSNR values correctly. The information component of the signal has a relatively high power level (up to 30 dB greater than the noise) while the noise floor component has a very low power level. It is very difficult to design a circuit to measure a signal with the large dynamic range (up to 60 dB) that can occur in such a DWDM signal.

Three devices have traditionally been used to perform optical power measurements: the optical spectrum analyzer (OSA), an optical grating plus a detector array analyzer and the filter analyzer. The optical spectrum analyzer is a piece of laboratory equipment, large, bulky and expensive. It accomplishes bandpass filtering or splitting of the signals using a detraction grating to separate wavelengths, and a detector which measures the power in the wavelength that the signal has been broken into. The OSA can be highly accurate if enough time is allowed for enough energy to impinge on the detector. Because of the size, cost and time needed, it is not practical to utilize OSAs in a DWDM system.

The detector array analyzer uses a bulk grating and a detector array. This device satisfies the size and cost requirements for multiple deployments in a DWDM system, but has limitations as to resolution. The filter analyzer is based on a Fabry-Perot filter to determine the wavelength to be measured by the detector. If the spacing of the detector array is narrow enough, the difference between the noise and the channel can be measured. However, because the filter is designed to span multiple channels, the optical resolution is limited. Both the bulk grating and the Fabry-Perot filter can be made small and inexpensive enough to be used in multiple locations in a DWDM system, but they can only measure OSNR to 20 to 25 dB when the DWDM channel spacing is 50 Ghz or less. This limitation results in the measurement error described above and the attendant system inefficiency.

As the channel spacing decreases with increasing system capacity, it becomes more necessary to use the OSNR measurement. The best system performance can be realized by equalizing OSNR rather than power. With a built-in optical channel monitor, OSNR can be measured in realtime in the system. For long-haul systems, the OPM facilitates balancing of the optical power to minimize the effects of fiber amplifier gain non-uniformity. In addition, as an increasing number of vendors and service providers come into the DWDM market, it is desirable to use equipment (such as transmitters, optical amplifiers, and receivers) from multiple vendors in the same DWDM system. A small an economical OPM provides a useful tool for system turn-up, operation and troubleshooting in such a mixed vendor environment. Consequently, there is a need for a small, economical high resolution optical monitor that can be utilized and mounted with circuit boards implementing a DWDM system.

BRIEF SUMMARY OF THE INVENTION

A high resolution optical performance monitor measures the Optical-Signal-to-Noise-Ratio (OSNR) of an optical signal, having channel and noise components. The high resolution optical performance monitor uses a notch filter to separate signal from noise, and two detectors, one for signal and one for noise measurement. The high resolution optical performance monitor is compact and economical to produce, allowing it to be used at each receiver in an optical system. When an in-fiber Bragg grating (FBG) implements the notch filter, the filter response can be made narrow-band and shaped like the optical signal thereby increasing the accuracy of separation of signal and noise. The resolution of each of the detectors can be tailored to the expected power of the channel components, thereby increasing the resolution of the optical performance monitor. The high resolution optical performance monitor provides the resolution needed for DWDM systems with channel spacing down to 50 Ghz and smaller.

A high resolution optical performance monitor tailored for single channel operation requires relatively inexpensive components. One high resolution optical performance monitor able to handle the multiplexed signals of a DWDM system utilizes a tunable notch filter in conjunction with a bandpass filter. Alternative implementations incorporate cascaded notch filters and tunable bandpass filters. The narrow-band FBG notch filter is well matched to the tolerances needed to separate signal from noise in a DWDM system.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Figure 1:
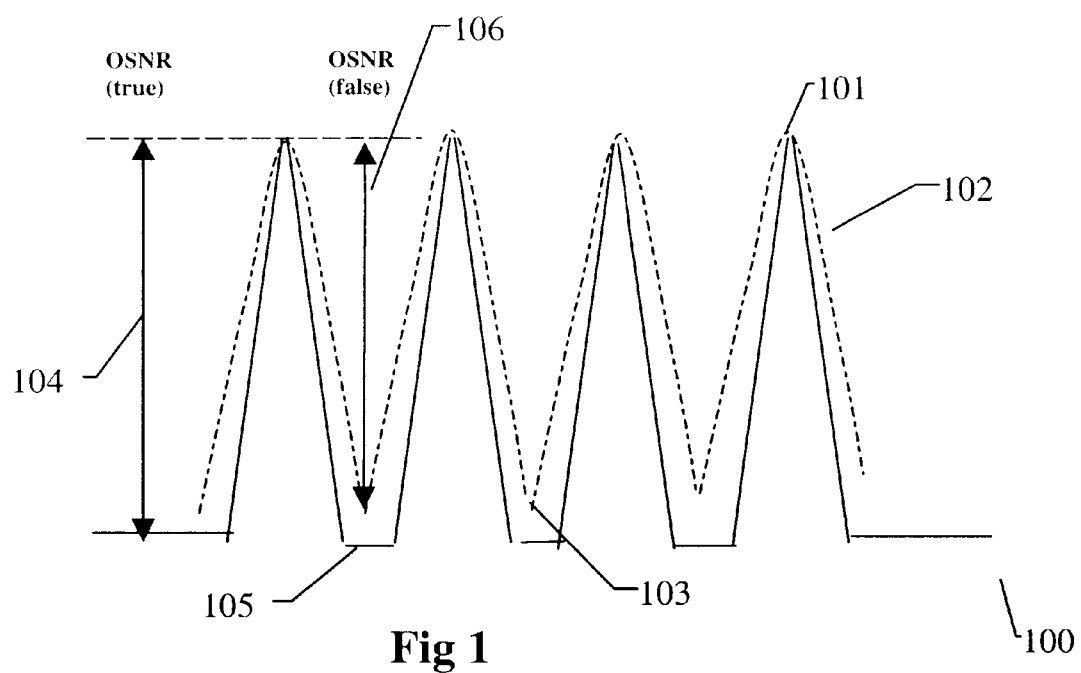
FIG. 1 is an illustration of a hypothetical DWDM signal waveform, the associated true OSNR values, and the OSNR values as measured by prior art optical power monitors.

An idealized multiplexed optical signal 100 is shown in FIG. 1. The peaks of the waveforms 101 represent the information carrying wavelengths, while the flats 105 between the peaks represents the noise floor of the signal. The true OSNR is the ratio of the channel power to the noise power as represented by arrow 104. An OPM with insufficient resolution does not detect the true signal 100, but rather a lower resolution signal represented by the dashed line 102. While the low resolution signal 102 represents the channel power 101 correctly, its noise floor 103, is not represented accurately. Consequently, the OPM measures a false OSNR 106.

Figure 2:
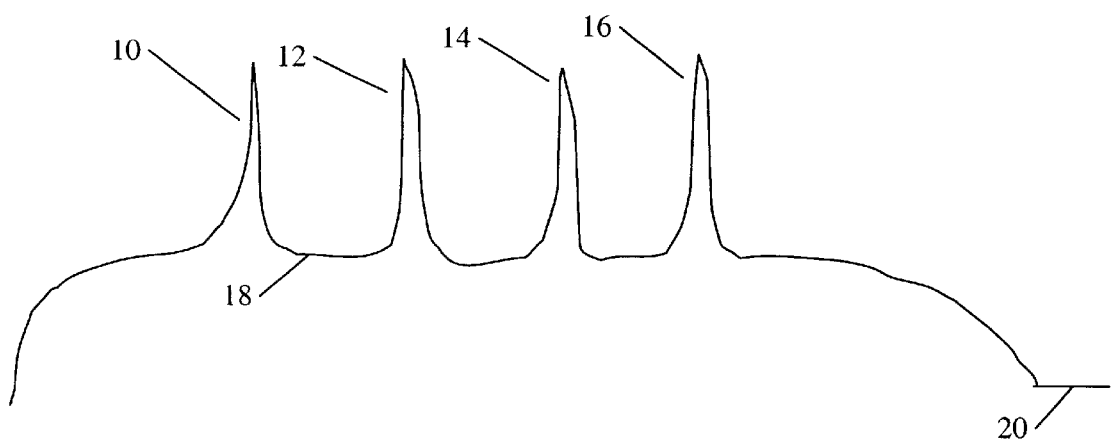
FIG. 2 is a diagram of a DWDM signal.

A Dense Wavelength Division Multiplexing system places optical information channels at separate wavelengths in an optical signal where the wavelengths used are closely packed (separations as close as 50 GHz are currently used). FIG. 2 shows a power spectrum over a frequency range for a DWDM signal. Peaks 10, 12, 14 and 16 represent the center wavelengths used to carry four separate information channels. The portion of the waveform 18 elevated from a baseline 20 represents the noise floor of the DWDM system due to the use of optical amplifiers.

In order to reliably carry communications the channel OSNR must be maintained at a desirably high level. When the OSNR is accurately measured, an optical DWDM system can be balanced to maximize the number of channels carried in the system and the distance between re-amplifications. If the OSNR is inaccurately measured, the power levels of some information channels may be set unnecessarily high, wasting some of the power spectrum that would be otherwise available for use by other channels in the system. Alternately, the power of some channel may be set too low so the OSNR is insufficient to provide error-free link performance. The inaccurate OSNR measurement can also result in an un-optimized system turn-up that may not be able to meet the design target. Such an un-optimized system may give false alarms to the network management system during operation.

Figure 3:
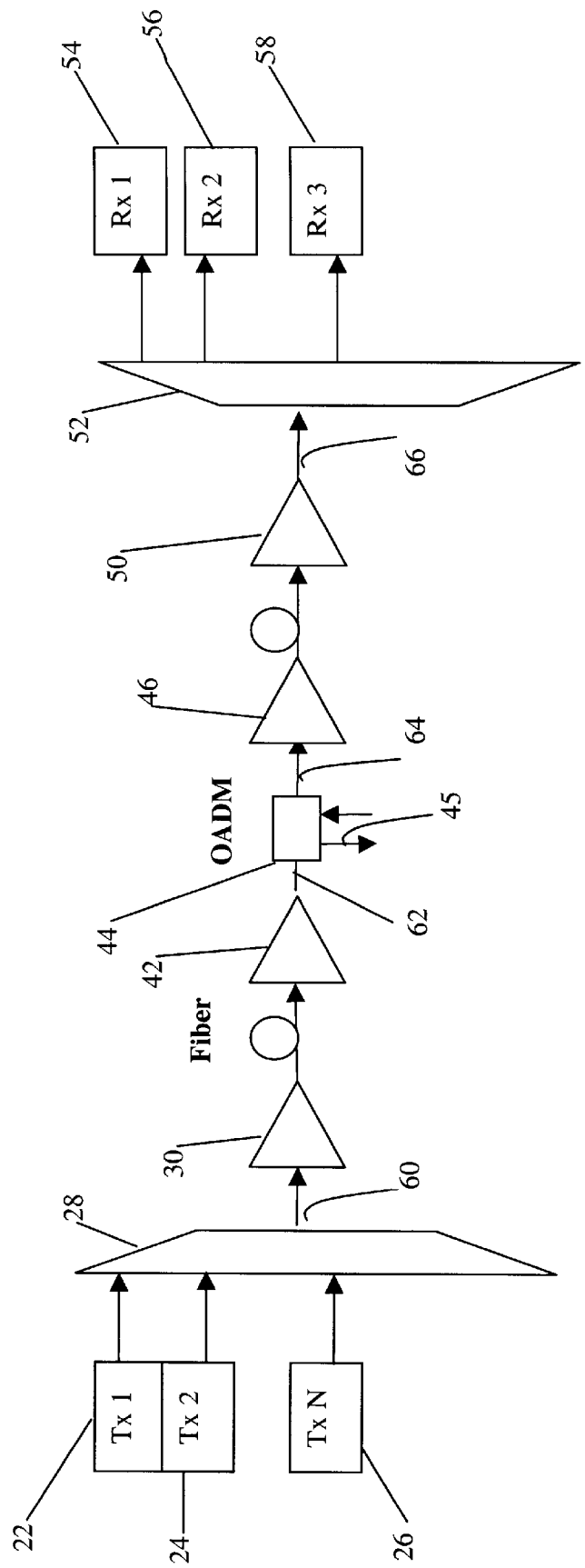
FIG. 3 is a block diagram of a DWDM transmission system.

FIG. 3 illustrates the typical elements of an optical network in a DWDM system. The transmitter signals 22, 24, and 26 are combined by a multiplexor 28 onto one fiber that carries all the channels. Optical amplifiers 30, 42, 46 and 50 assure that a signal of adequate power is transmitted over the span and adequate power is delivered to demultiplexor 52. Channels are dropped and added by an add/drop multiplexor 44. The use of amplifiers 42 and 46 before and after the OADM compensate for the OADM loss. Once the signal is received by the demultiplexor 52, it is broken into its component channels, which are then delivered to the respective receivers, 54, 56 and 58.

The amplifiers 30, 42, 46 and 50, used in the DWDM system are typically erbium doped fiber amplifiers. These amplifiers amplify the multiplexed optical signals, but also inject noise into the signal across the wavelength spectrum. Therefore, at least four places 60, 62, 64 and 66 in the DWDM system are necessarily monitored using OPMs coupled to the optical fiber as is known in the art. The output of the multiplexor 28 is monitored to determine whether each channel signal suffers unexpected loss between transmitter and amplifier. An input to the multiplexor can be adjusted to compensate for problems, such as signal strength, at monitoring point 60. Measuring the signal going into the add/drop multiplexor 44 allows the system to be tuned to compensate for a channel being added or dropped. For instance, if the channel carrying signal 45, which is dropped at the OADM 44, suffers from low OSNR or power, the signal 45 can be adjusted at the transmitter and/or amplifier site to produce a higher OSNR or power.

Figure 4:
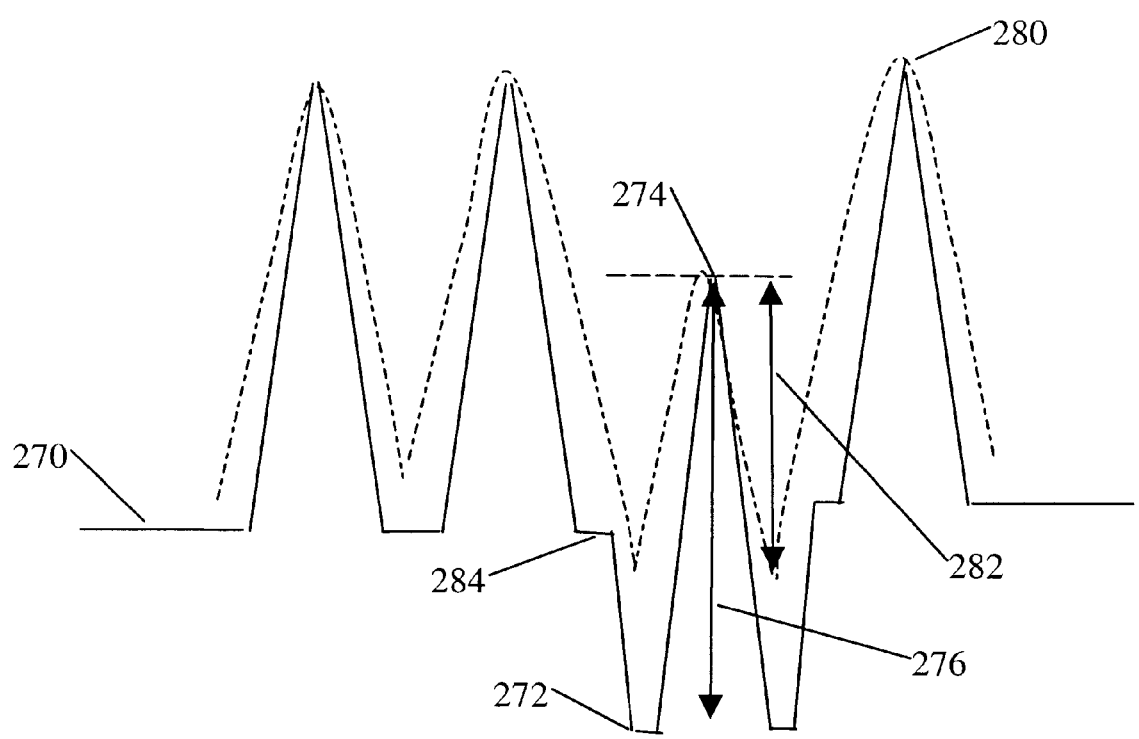
FIG. 4 is an illustration of the waveform existing at an optical add/drop channel multiplexor as shown in FIG. 3.

The output of the add/drop multiplexor 64 is monitored to measure the channel power levels. The OADM 44 can inject added signals at different power levels than the express channels (those channels passing through the OADM 44 without modification) in the multiplexed signal. This measurement is very difficult to make with a high degree of accuracy because of the low noise levels that may be present at the output of the OADM. A detector that can measure the signal power may have too gross a resolution to distinguish the low noise levels. FIG. 4 illustrates an exemplary OADM output. In FIG. 4, a channel has been dropped and a new one added at the third peak 274. The noise level associated with the old channel has been dropped, moving the noise level near the channel 274 from the level at 284 to the level at 272. The power of the new channel 274 is added to this new noise level 272. Therefore, the new channel 274 does not exhibit the same power level as other channels in the multiplexed signal. Because prior art OPMs cannot measure the lower noise level at 272, they report the OSNR represented by arrow 282 rather than the actual OSNR represented by arrow 276. Because the disclosed high resolution optical power monitor can measure noise floor 272 correctly, it can report the correct OSNR.

Just before the combined signals are demultiplexed by demultiplexor 52, the signal is also monitored to find weak signals that need compensation. Compensation can be applied to signals with weak OSNR or power by increasing the power in their transmitter. After the adjustment, all signal channels will have similar OSNR and every channel will be able to meet its expected BER target.

Figure 5:
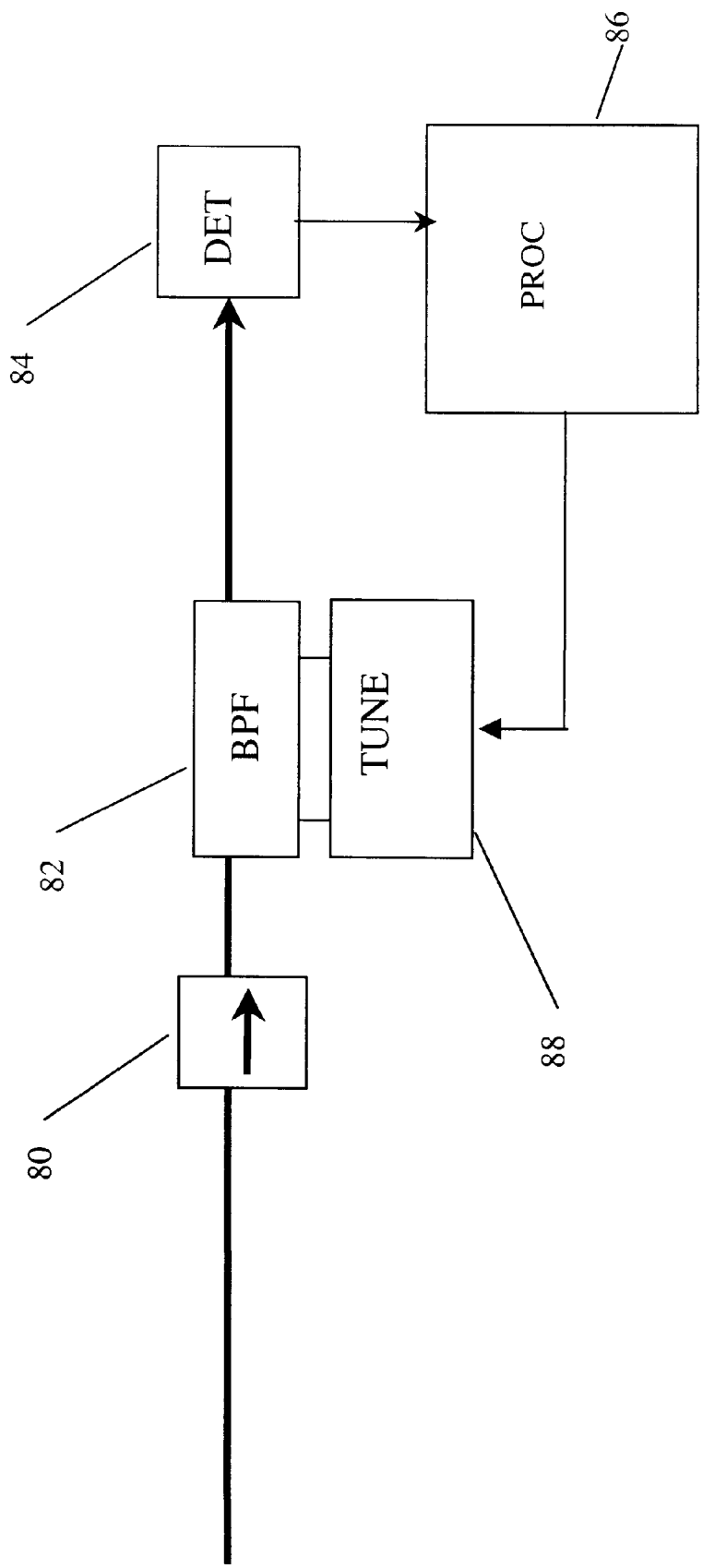
FIG. 5 is block diagram of the components used in prior art bandpass filter spectrum analysis.

A prior art circuit for measuring optical power is illustrated in FIG. 5. An isolator 80 prevents any reflections created by tunable bandpass filter 82 from disturbing the actual signal being monitored. The optical output of the bandpass filter 82 is fed to a detector 84. An electrical signal representing the power in the optical signal is fed to a processor 86. The processor 86 generates a control signal control a tuner 88 for the tunable bandpass filter 86. The bandpass filter 82 allows only the wavelengths within the bandpass region to pass through it. When the bandpass filter 82 is centered on a channel, then the detector 84 measures the power of the channel. When the bandpass filter 82 is centered away from any channels, then the detector 84 measures the power of the noise floor. The optical detector 84 converts the optical power into an electrical signal which can be digitized and manipulated by the processor. The detector 84 has only one output electrical range, which is used for both the channel power and the noise power measurements. Once measurement at a particular bandpass center frequency has been taken by the processor 86, the processor 86 retunes the center frequency of the bandpass filter 82 for the next measurement.

Figure 6A:
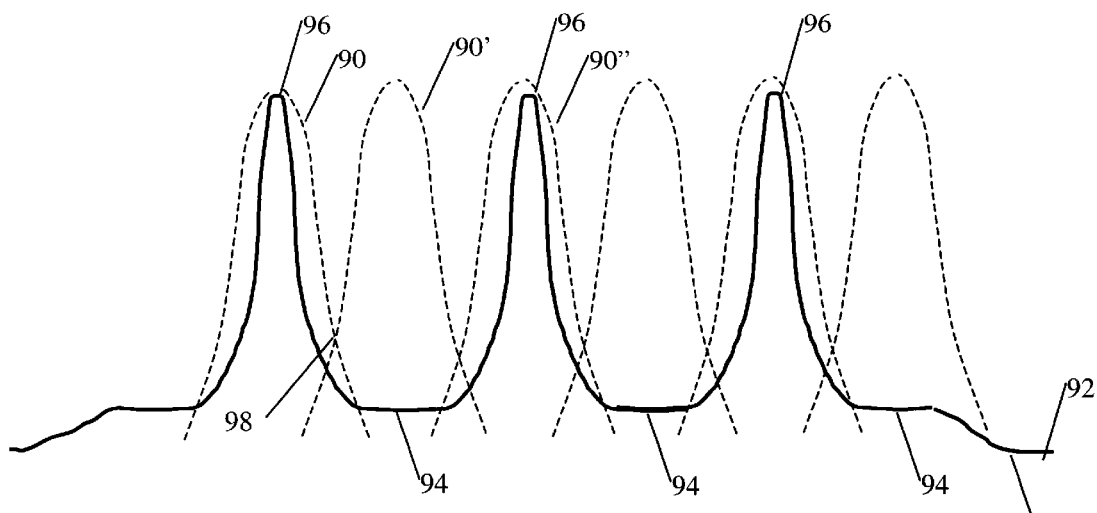
FIGS. 6a, 6b and 6c are illustrations of the waveform existing at an optical add/drop channel multiplexor as shown in FIG. 3.
Figure 6B:
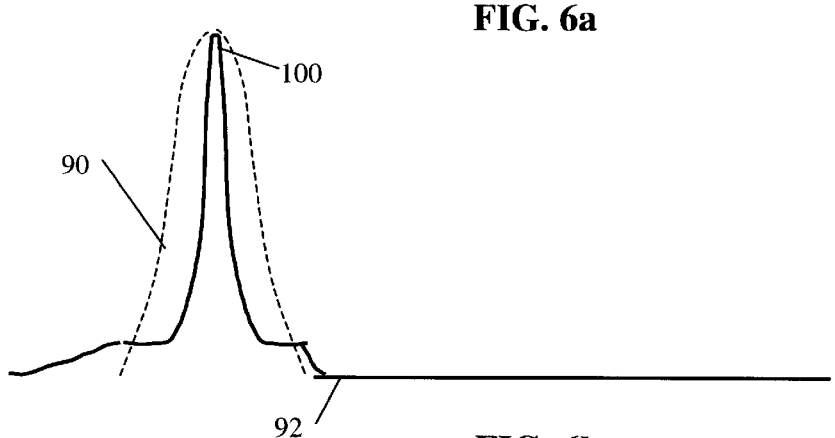
Figure 6C:
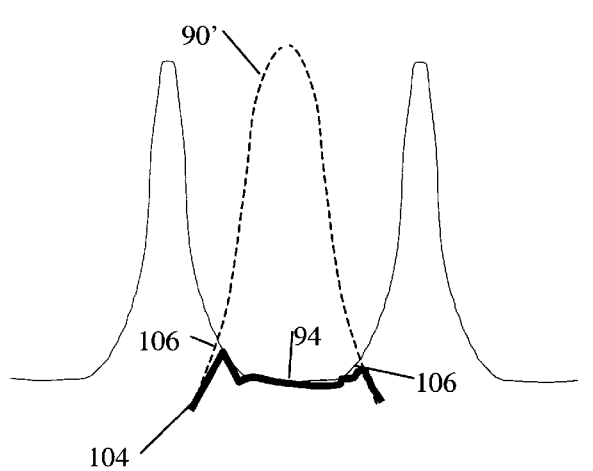

The traditional steps for measuring OSNR using the circuit of FIG. 5 are illustrated in FIG. 6. FIG. 6*a* shows a signal 91 to be measured. The signal 91 has a base power level 92, a noise floor 94 and a number of channels 96. In order to measure the OSNR across the frequency spectrum, the bandpass filter 82 is tuned to sequentially select portions of the frequency range 90, 90', 90" etc. The signal after passing through the bandpass filter 82 in region 90 is illustrated in FIG. 6*b*, and in range 90' is illustrated in FIG. 6*c*.

FIG. 6*c* illustrates the results of applying the bandpass filter 82 to the noise floor 94. The bandpass filter 82 when set to range 90', does not completely isolate the noise floor 94 from the channel signal 96. Power from tails 106 of the channels 96 is also passed when the noise floor 94 is selected in operating range 90'. The resulting a waveform 104, fed to the detector 84, has too much power. This extra power distorts the accuracy of the noise floor readings.

Selecting a width for bandpass filter 82 is difficult. One requirement is that the filter should be wide enough to cover the whole modulated signal linewidth for an accurate signal power measurement. The competing requirement is that the filter should be narrow enough to reject the signal power when measuring the noise. A conventional OPM is unable to meet both needs sufficiently to obtain accurate OSNR measurements in DMDW systems.

Figure 7:
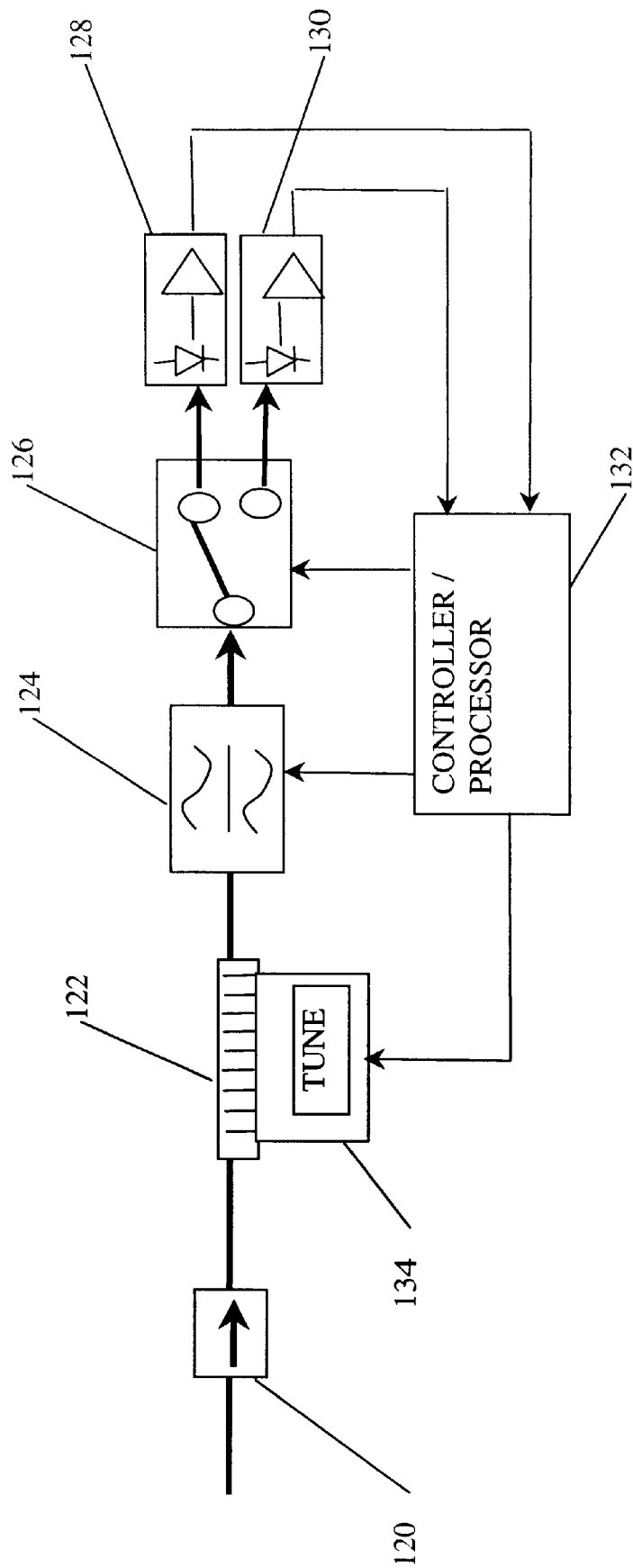
FIG. 7 is a block diagram of the basic configuration of one tunable high resolution optical power monitor in accordance with the present invention.

FIG. 7 shows one implementation of an improved OPM utilizing a narrow-band notch filter that is implemented as an in-fiber-Bragg grating (FBG). The OPM is first isolated from the main transmission path by an isolator 120. The optical signal passes through a narrow-band notch filter 122 and a tunable bandpass filter 124. Depending on whether the power in the channel or the noise is to be measured, a switch 126 directs the optical signal to either a first detector 128 or a second detector 130. The electrical outputs of the detectors are received by controller/processor 132 which cycles the tuning of the FGB filter 122, the tuning of the bandpass filter 124 and the setting of the switch 126 for further measurements across a frequency band of interest.

The isolator 120, as previously described, prevents reflections from the monitor back to the multiplexed channel. The FBG narrow-band notch filter 122 permits all wavelengths to pass through it undistorted except for a narrow-band around the wavelength where it is centered. It is much easier to build a notch filter with a very narrow pass band than it is to build a very narrow passband bandpass filter. A FBG filter can be fixed or be tunable within a range of wavelengths. In applications in DWDM systems, the ideal shape of the optical spectrum of the notch filter cancels the optical spectrum of a signal.

Figure 8A:
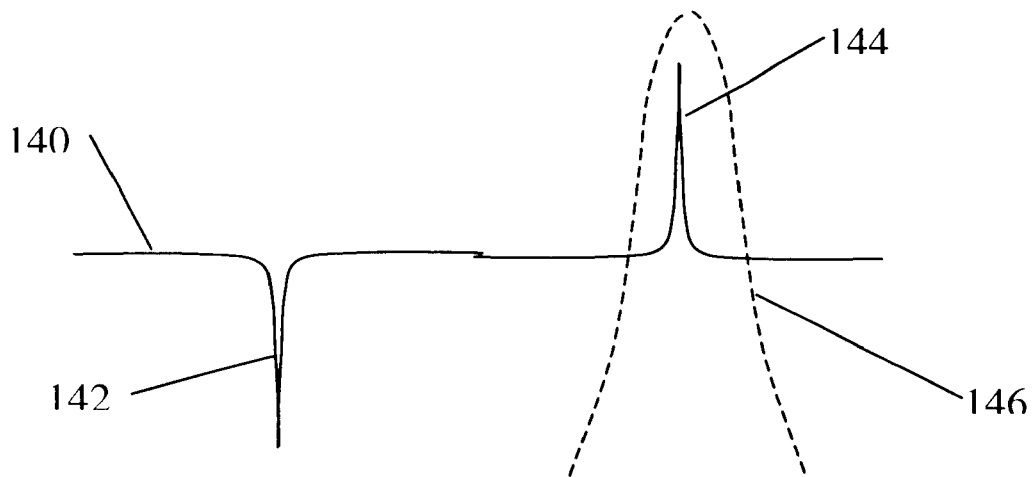
FIG. 8a is a signal spectrum into a first detector in the high resolution optical power monitor of FIG. 7.
Figure 8B:
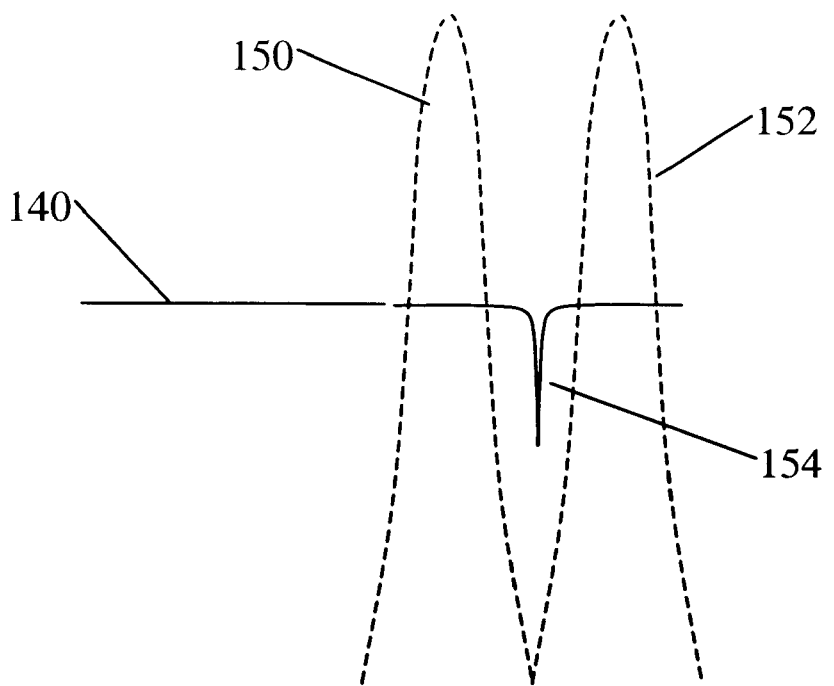
FIG. 8b is the signal spectrum into a second detector in the high resolution optical power monitor of FIG. 7.

This is illustrated in FIGS. 8*a* and 8*b*, in which the solid line indicates a waveform after passing through the narrow-band notch filter 122 and the dotted line indicates a frequency range placement of the bandpass filter 124. When the notch filter 122 is centered in the noise region, FIG. 8*a*, it filters out some noise from the noise floor 140, as shown at 142. However, the information channel 144, passes through unattenuated by the notch filter 122. When the notch filter 122 is centered on a channel, FIG. 8*b*, it filters out both the channel and any associated noise as shown at 154.

The bandpass filter typically has a response as illustrated by the dotted line 146 in FIG. 8*a*. Note that when the bandpass filter 124 is centered on the information channel 144, the information channel 144 and some portion of the noise floor 140 passes through. The bandpass filter 124 selects the frequency range to be fed to the detectors 128 and 130. When the channel 144 is to be measured FIG. 8a, the tunable bandpass filter 124 is set to encompass the channel 144 and the notch filter is set away from the channel 144. When the noise 140 is to be measured FIG. 8b, the tunable bandpass filter 124 is set to either of the positions 150 or 152 and the notch filter 122 is set the center of the signal spectrum to cancel the channel power 144 as shown at 154. While the noise power could be measured at either of positions 150 or 152 alone, measurement accuracy is improved by measuring at both positions and averaging. The unflattened EDFA noise floor 140 may cause the noise power to the left of the channel 144 to be different from the noise power to the right of the channel 144. In this case, Equation 2 is used by the processor 132 to calculate OSNR.

$$OSNR(\text{dB}) = 10 \log \left( \frac{P_{sig}}{\frac{1}{2}(P_{noise\_left} + P_{noise\_right})} \right) \quad \text{Eq. 2}$$

If more rapid measurement is desired, the improved accuracy of measuring on both sides of the channel can be sacrificed by measuring on only one side. The OSNR measurement for each of the channel carriers is carried out sequentially. The power for each channel is measured and the noise around the channel is measured.

After the signal has passed through the notch filter 122 and the bandpass filter 124, the power in the signal is measured by a photodetector. Since the channel power can be 30 dB greater than the noise power, two detectors 128 and 130 having different resolutions are used. Signal detector 128 is a low gain detector used to measure channel power. Its full resolution is used to measure the higher power information component of the signal, so one step in its range may represent 0.1 watts of power for example. Noise detector 130, is a high gain detector used to measure noise power. Its full resolution is used to measure the low power noise component of the signal, so one step in its range may represent 0.001 watts of power for example. The processor 132 normalizes the output of detector 128 the higher resolution of the noise measurement, so the OSNR reading can be expressed at the higher resolution.

Controller/processor 132 coordinates the components in making the measurements. Therefore, when measuring channel power, the controller 132 tunes the notch filter 122 to allow the channel to pass, tunes the bandpass filter 124 to select the channel, sets the switch 126 to feed the resultant optical signal to the low-gain detector 128 and normalizes the output of the low-gain detector 128. When the noise measurement is in progress, the controller 132 centers the notch filter 122 on the signal, tunes the bandpass filter 124 to either side of the channel, and sets the switch 126 to feed the resultant optical signal to the high-gain detector 130.

The circuit of FIG. 7 can be used at monitor points 60, 62, 64 and 66 of FIG. 3. Additionally, in a completely monitored system, this circuit can be used to measure OSNR for each channel at the receivers 54, 56 and 58.

Figure 9:
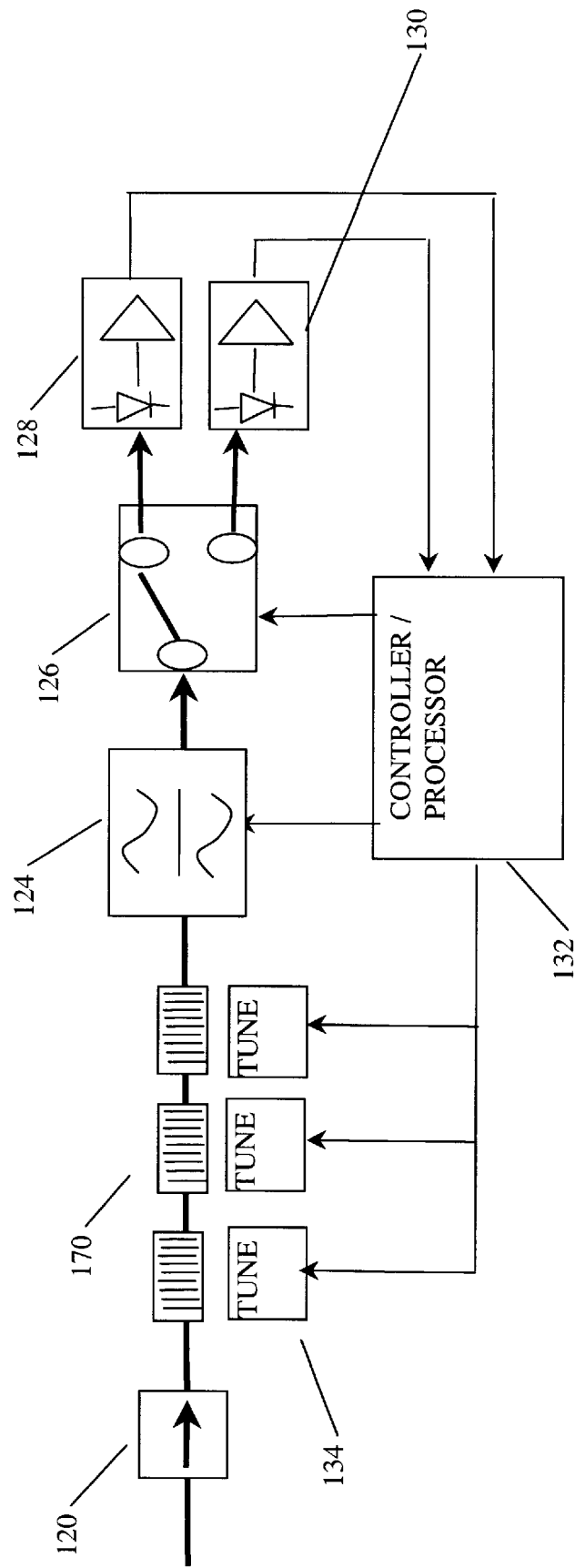
FIG. 9 is a schematic of an alternative tunable high resolution optical power monitor for multiple channels in accordance with the present invention.

An alternative OSNR measuring system is illustrated in FIG. 9. Here, the single tunable FBG notch filter 122 of FIG. 7 is replaced by a set of tunable cascaded FBG notch filters 170. The center frequencies of the cascade are spaced such that the notch flters 170 can filter out a number of sequential channels in the system. The remaining components are as in FIG. 7, except that controller/processor 132 is programmed differently. The cascaded FGB notch filters 170 are centered to allow a set of channel signals to pass through. The bandpass filter 124 is centered on the channel whose power is to be measured, and the switch 126 is set to direct the filtered signal to the low gain detector 128. The signal power for that one channel is measured and registered in the processor 132. The bandpass filter 124 is then tuned to the next channel for the next power measurement. Channel power is measured for a sequence of channels up to the number of notches in the cascaded notch filters 170. Each one of the cascaded notch filters can be tuned independently. Therefore, the cascaded notch filters have a much wider tuning range than the single filter.

After the set of channel powers has been measured, the noise powers are measured. The cascaded notch filter 170 is tuned to cancel out several signal channels, and noise measurements are taken on each side of the channels by successively tuning the bandpass filter 124. In particular, during the measurement of channel power shown in FIG. 10a, the notches are placed at locations 190 in the noise region to allow the information channels 188 to pass. The bandpass filter 124 is set sequentially at locations 180, 182, 184, etc. The switch 126 directs the output of the bandpass filter 124 to the first detector 128 to measure the power in the respective channel.

Figure 10A:
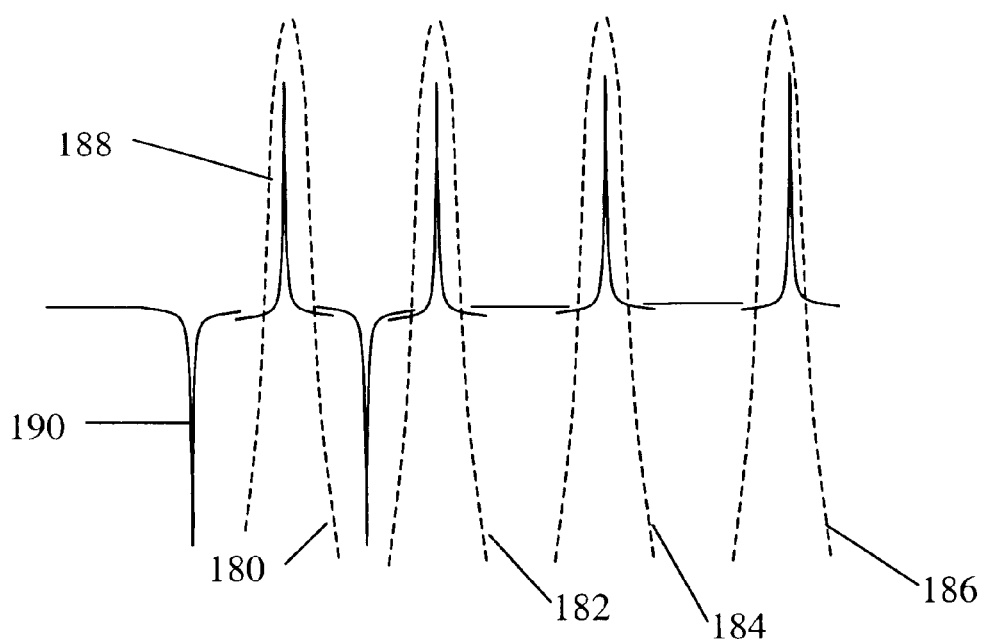
FIG. 10a is a signal spectrum into a first detector in the high resolution optical power monitor of FIG. 9.
Figure 10B:
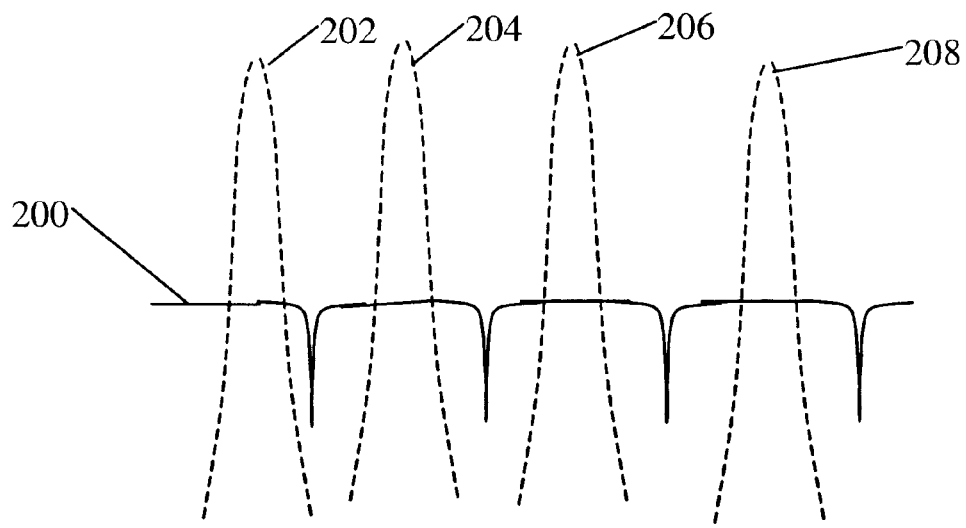
FIG. 10b is a signal spectrum as measured by a second detector in the high resolution optical power monitor of FIG. 9.
Figure 11:
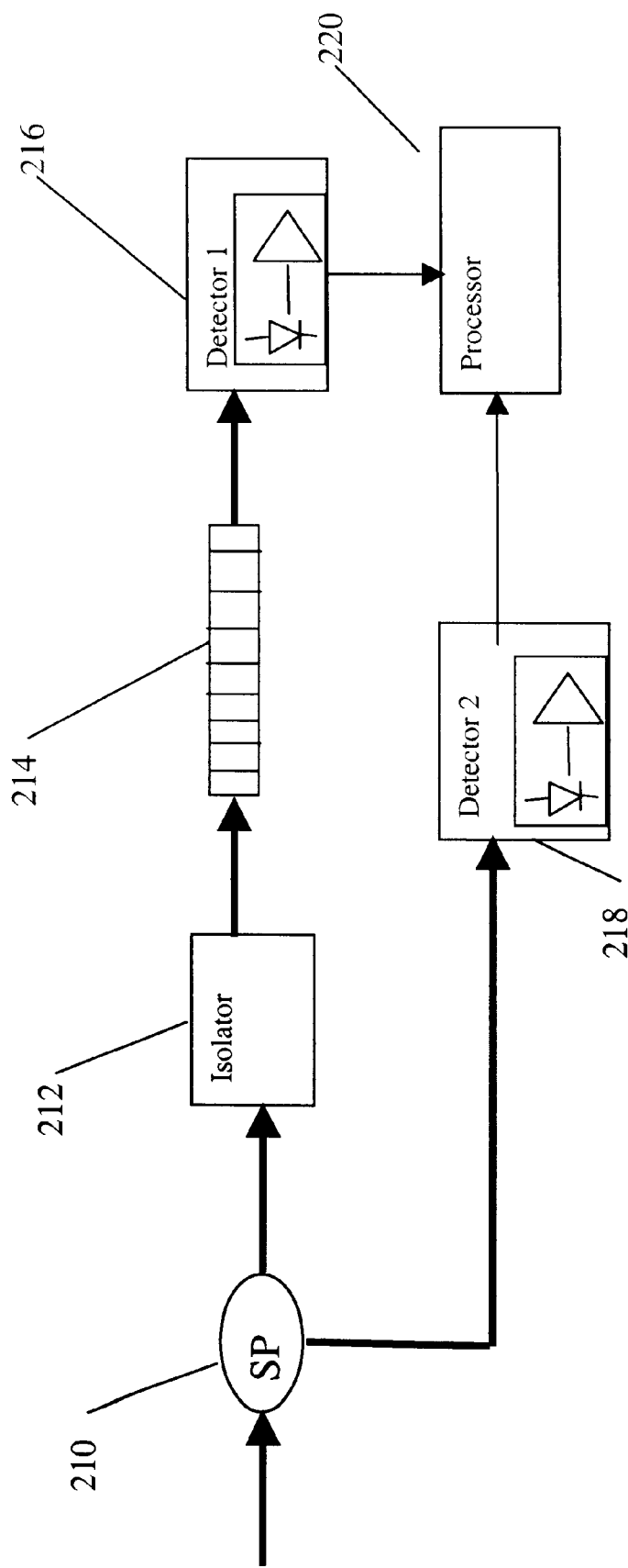
FIG. 11 is a block diagram of an alternative high resolution optical power monitor in accordance with the present invention.
Figure 12A:
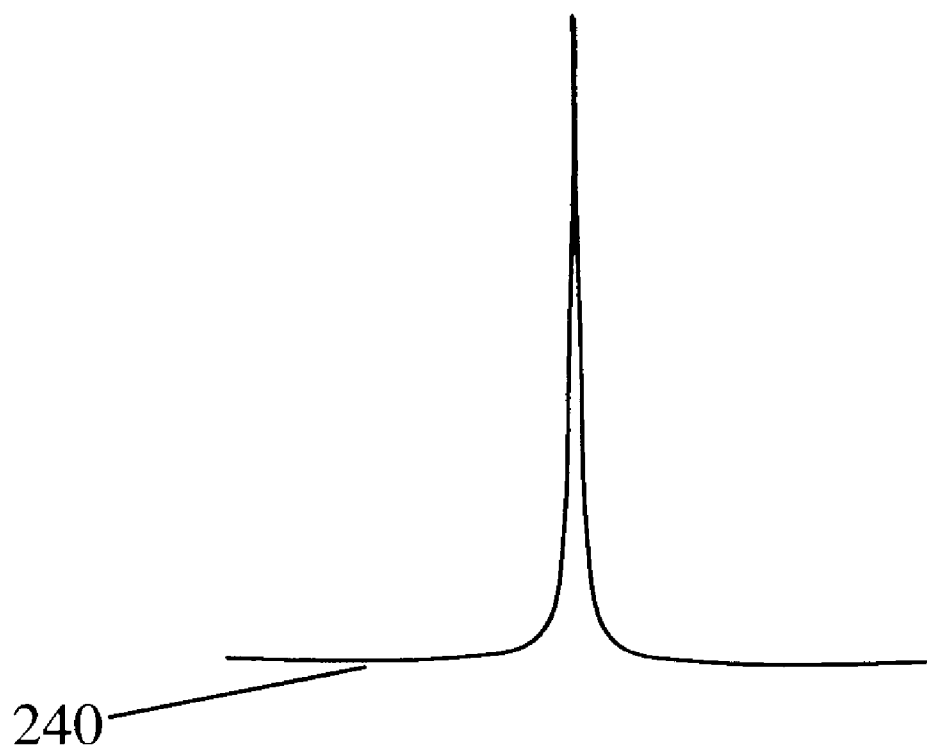
FIG. 12a is a signal containing information and noise as provided to a first detector in the high resolution optical power monitor of FIG. 11.
Figure 12B:
FIG. 12b is a signal spectrum of noise only as provided to a second detector in the high resolution optical power monitor of FIG. 11.

After the signal powers have been measured as illustrated by FIG. 10a, the cascaded notch filter 170 is tuned to cancel out several of the signals as shown in FIG. 10b. The switch 126 is set to direct the signals to the second detector 130. The tunable bandpass filter 124 is centered, for instance, to the left of the first channel as shown in FIG. 10b position 202 and the noise at this position is measured. The bandpass filter is then moved sequentially to positions 204, 206, etc. and the noise power for the respective channels are measured. Eq. 1 above is used by the processor/controller 132 to calculate the OSNRs. If it is desired to average the noise on either side of the channels, then the tunable bandpass filter 124 is centered the same distance to the right and left of the channel and the measurements are made. Equation 2 is then used to calculate the OSNR of each of the channels. FIG. 11 illustrates a high resolution OSNR monitor that can be used on a single optical channel, as illustrated at 45, 54, 56 or 58 in FIG. 3. As shown, a splitter 210 splits the signal. The power splitting ratio can be 50/50 or other value depending on the detector sensitivities for the signal and noise measurement. Part of the signal is sent to a notch filter 214 and part directly to a first detector 218. A second detector 216 measures the optical output of the notch filter 214, and a processor 220 collects the readings from both detectors. An isolator 212 prevents reflections from the notch filter 214 from feeding back to the main path. The notch filter 214 is centered on the signal channel being measured, so the signal out of the notch filter 214 carries only the noise component of the signal as illustrated in FIG. 12b. Second detector 216 is a high gain detector used to measure the noise power. The low gain detector 218 is used to measure the power of both the channel and the noise. Equation 3 is used by the processor 220 to calculate OSNR, where $P_X$ represents the power measured by detector x.

$$OSNR(\text{dB}) = 10 \log \left( \frac{P_1 - P_2}{P_2} \right) \quad \text{Eq. 3}$$

The circuit of FIG. 11 can be less expensive than the circuits of FIGS. 7 and 9, because the notch filter 214 does not need to be tunable and there is no bandpass filter or switch.

Figure 13:
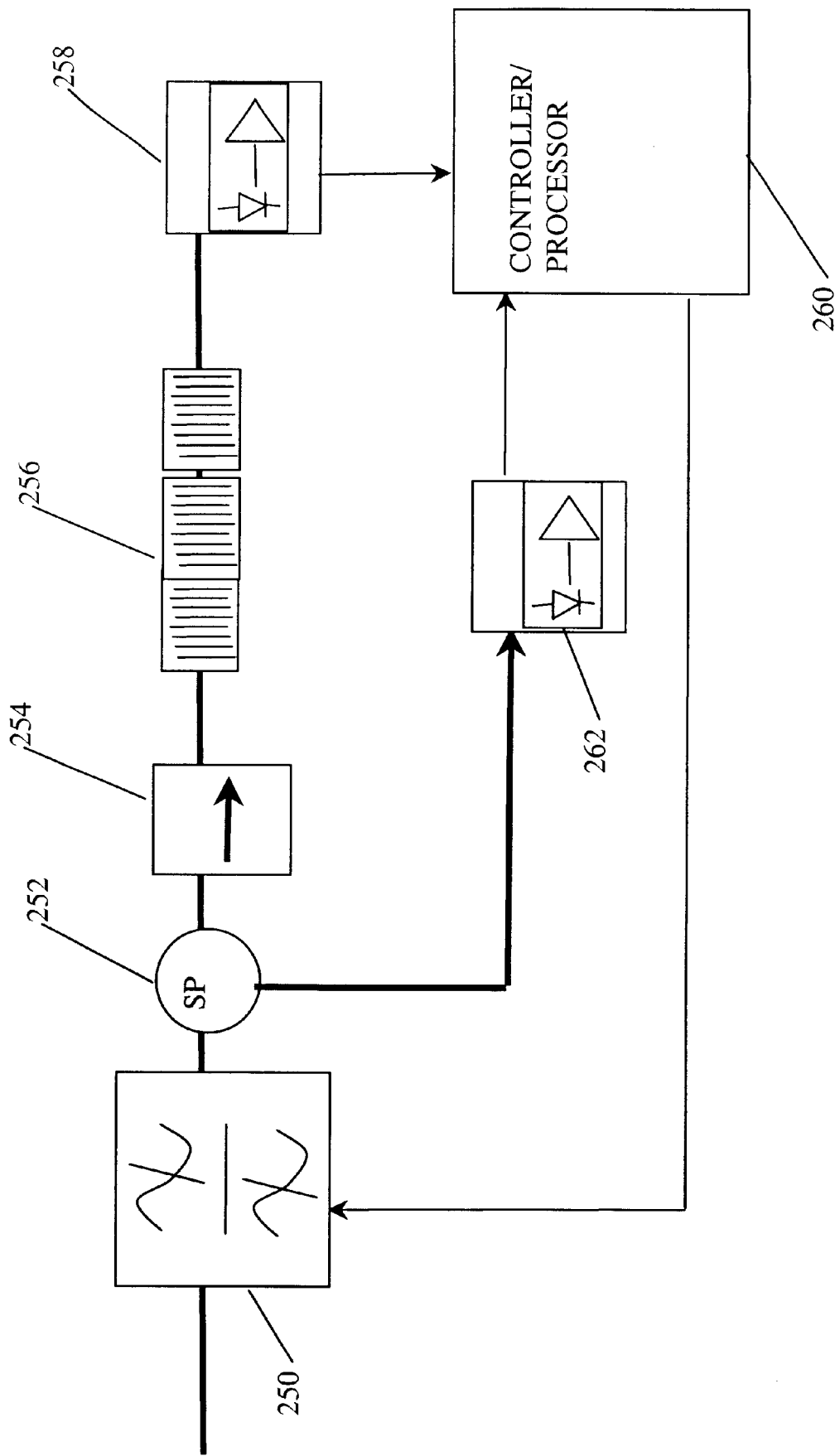
FIG. 13 is a block diagram of a wide range high resolution optical performance monitor.

An extension of the circuit of FIG. 11 is illustrated in FIG. 13. Here, the signal passes through a tunable bandpass filter 250 before being split between a cascaded notch filter 256 and a detector 262. The circuit of FIG. 13 can be used on a multiplexed signal such as a DWDM signal. The tunable bandpass filter 250 selects a region surrounding the region encompassing one channel, blocking all other channels. The cascaded notch filter 256 has a notch for each information channel in the multiplexed signal. For each measurement, the tunable bandpass filter 250 is set to the respective channel. The low gain detector 262 measures channel and noise powers, while the high gain detector 258 measures only the noise for the selected channel. Equation 3 is used to determine the OSNR for each channel.

It will be apparent to those of ordinary skill in the art that other embodiments incorporating the disclosed concepts may be used. Accordingly, it is submitted that the invention should not be limited by the described embodiments but rather should encompass the spirit and full scope of the appended claims.

We claim:

1. An apparatus for measuring the optical-signal-to-noise-ratio (OSNR) of an optical signal having an optical spectrum and at least one channel, each channel having a center frequency, said apparatus comprising:

a splitter to split said optical signal into first and second paths;

in said first path, a narrow-band optical notch filter centered on one center frequency of said at least one channel receiving a first optical signal on said first path and outputting a notch filtered optical signal to a first detector to provide a first electrical signal indicating an optical noise power of said notch filtered optical signal;

in said second path, a second optical signal from said splitter is provided to a second detector that provides a second electrical signal indicating an optical channel and noise power of said second optical signal;

a tunable bandpass filter disposed before said splitter, wherein said tunable bandpass filter is operative to be tuned to at least one center frequency of said at least one channel, and wherein said narrow-band notch filter is a cascaded narrow-band notch filter having a plurality of notches each notch centered on a center frequency of said at least one channel; and a processor to calculate OSNR based on said first and said second electrical signals wherein said processor is further operative to select said center frequency of said tunable bandpass filter.

2. The apparatus of claim 1 wherein said optical signal is a wavelength-division-multiplexed (WDM) optical signal.

3. The apparatus of claim 1 wherein said optical signal is a dense-wavelength-division-multiplexed (DWDM) optical signal.

4. The apparatus of claim 1 further comprising a tunable bandpass filter disposed before said splitter, wherein said tunable bandpass filter is operative to be tuned to at least one center frequency of said at least one channel, and wherein said narrow-band notch filter is a tunable narrow-band notch filter operative to be tuned to said at least one center frequency of said at least one channel, and wherein said processor is further operative to select said center frequency of each of said tunable bandpass filter and said tunable narrow-band notch filter.

5. The apparatus of claim 4 wherein said optical signal is a wavelength-division-multiplexed (WDM) optical signal.

6. An apparatus for measuring the optical-signal-to-noise-ratio (OSNR) of an optical signal having an optical spectrum and at least one channel having a center frequency, said apparatus comprising:

a tunable narrow-band notch filter receiving said optical signal, said tunable narrow-band notch filter adapted to be tuned to at least one center frequency of said at least one channel and to frequencies proximate to each center frequency of said at least one channel;

a tunable bandpass filter coupled to said tunable narrow-band notch filter and adapted to be tuned to each center frequency of said at least one channel and to frequencies proximate to each center frequency of said at least one channel;

a switch operative to selectively direct an optical bandpassed signal received from said bandpass filter to a first and a second output;

a first optical power detector coupled to said first output of said switch and operative to measure an optical power of said optical bandpassed signal;

a second optical power detector coupled to said second output of said switch and operative to measure an optical power of noise in said optical bandpassed signal; and a processor, operative to control said apparatus for each of said at least one channel to:
   i. tune the center frequency of both said tunable narrow-band notch filter and said tunable bandpass filter for measurement of signal power of a selected channel;
   ii. set said switch to direct said optical bandpassed signal to said first detector;
   iii. receive said optical power measurement from said first detector;
   iv. tune the center frequency of both said tunable narrow-band notch filter and said tunable bandpass filter for measurement of noise power of said selected channel;
   v. set said switch to direct said optical bandpassed signal to said second detector;
   vi. receive said optical power measurement from said second detector; and
   vii. calculate an OSNR from said signal power and noise power measurements received from said first and second detectors.

7. The apparatus of claim 6 wherein said tunable narrow-band notch filter is implemented by a tunable Fibre-Bragg diffraction grating.

8. The apparatus of claim 6 wherein the response of said tunable narrow-band notch filter and the shape of said optical signal spectrum are approximately inverse.

9. The apparatus of claim 6 wherein said first detector is a low gain circuit and said second detector is a high gain circuit.

10. The apparatus of claim 6 further comprising an isolator installed before said tunable narrow-band notch filter.

11. The apparatus of claim 6 wherein said optical signal is a wavelength-division-multiplexed (WDM) optical signal.

12. The apparatus of claim 6 wherein said optical signal is a dense-wavelength-division-multiplexed (DWDM) optical signal.

13. The apparatus of claim 6 wherein said tunable narrow-band notch filter is a tunable cascaded narrow-band notch filter having a plurality of notches, each notch centered on one center frequency of said at least one channel and at frequencies proximate to said one center frequency of said at least one channel.

14. An apparatus for measuring the optical-signal-to-noise-ratio (OSNR) of an optical signal in a wavelength-division multiplexed optical communication system, said optical signal having a plurality of channels each having an optical signal spectrum and a center frequency, said apparatus comprising:

a tunable narrow-band notch filter receiving said optical signal, said tunable narrow-band notch filter adapted to be tuned to any of said plurality of center frequencies and to frequencies proximate to said center frequencies;

a tunable bandpass filter coupled to said tunable narrow-band notch filter to select said optical spectrum to be measured, said tunable bandpass filter adapted to be tuned to any of said plurality of center frequencies and to frequencies proximate to said center frequencies;

a switch operative to selectively direct an optical bandpassed signal received from said tunable bandpass filter to a first and a second output;

a first optical power detector coupled to said first output of said switch and operative to measure an optical power of said optical bandpassed signal;

a second optical power detector coupled to said second output of said switch and operative to measure an optical power of noise of said optical bandpassed signal; and a processor operative to control said apparatus for each of said plurality of channels to:
  i. tune the center frequency of both said tunable narrow-band notch filter and said tunable bandpass filter for measurement of signal power of a selected channel;
  ii. set said switch to direct said optical bandpassed signal to said first detector;
  iii. receive said optical power measurement from said first detector;
  iv. tune the center frequency of both said tunable narrow-band notch filter and said tunable bandpass filter for measurement of noise power of said selected channel;
  v. set said switch to direct said optical bandpassed signal to said second detector; vi. receive said optical power measurement from said second detector; and
  vii. calculate an OSNR from said signal power and noise power measurements received from said first and second detectors.

15. The apparatus of claim 14 wherein said tunable narrow-band notch filter is implemented by a Fibre-Bragg diffraction grating.

16. The apparatus of claim 14 wherein the response of said narrow-band notch filter and the shape of said optical signal spectrum are approximately inverse.

17. The apparatus of claim 14 wherein said first detector is a low gain circuit and said second detector is a high gain circuit.

18. The apparatus of claim 14 further comprising an isolator coupled to the input of said tunable narrow-band notch filter to prevent reflections.

19. An apparatus for measuring the optical-signal-to-noise-ratio (OSNR) of an optical signal in a wavelength-division multiplexed optical communication system, said optical signal having a plurality of channels each having an optical signal spectrum and a center frequency, said apparatus comprising:

a tunable cascaded narrow-band notch filter receiving said multiplexed optical signal, said tunable cascaded narrow-band notch filter adapted to be tuned to multiple ones of said plurality of center frequencies and on frequencies proximate to respective ones of said center frequencies;

a tunable bandpass filter coupled to said tunable narrow-band notch filter to select said optical signal spectrum to be measured, said tunable bandpass filter adapted to be tuned to any of said plurality of center frequencies and to frequencies proximate to said center frequencies;

a switch operative to selectively direct an optical bandpassed signal received from said bandpass filter to a first and a second output;

a first optical power detector coupled to said first output of said switch and operative to measure an optical power of a said optical bandpassed signal;

a second optical power detector coupled to said second output of said switch and operative to measure an optical power of noise in said optical bandpassed signal; and a processor, operative to control said apparatus for each of said plurality of channels to:
  i. tune the center frequency of both said tunable narrow-band notch filter and said tunable bandpass filter for measurement of signal power of a selected channel;
  ii. set said switch to direct said optical bandpassed signal to said first detector;
  iii. receive said optical power measurement from said first detector;
  iv. tune the center frequency of both said tunable narrow-band notch filter and said tunable bandpass filter for measurement of noise power of said selected channel;
  v. set said switch to direct said optical bandpassed signal to said second detector;
  vi. receive said optical power measurement from said second detector; and
  vii. calculate an OSNR from said signal power and noise power measurements received from said first and second detectors.

20. The apparatus of claim 19 wherein said tunable cascaded narrow-band notch filter is implemented by a cascaded Fibre-Bragg diffraction gratings.

21. The apparatus of claim 19 wherein the response of each of said cascaded narrow-band notch filters and the shape of said optical signal spectrum of the channels are approximately inverse.

22. The apparatus of claim 18 wherein said first detector is a low gain circuit and said second detector is a high gain circuit.

23. The apparatus of claim 19 further comprising an isolator coupled to the input of said tunable cascaded narrow-band notch filter to prevent reflections.

24. An apparatus for measuring the optical-signal-to-noise-ratio (OSNR) of an optical signal in a wavelength-division multiplexed optical communication system, said optical signal having a plurality of channels each having an optical signal spectrum and a center frequency, said apparatus comprising:

a tunable bandpass filter to select said optical spectrum of one channel to be measured, said tunable bandpass filter adapted to be tuned to any of said plurality of center frequencies and to frequencies proximate to said center frequencies;

a splitter coupled to said output of said tunable bandpass filter to split said optical signal into a first path and a second path;

in said first path, a cascaded narrow-band notch filter, having a plurality of notches each notch centered on a center frequency of said plurality of channels receiving a first optical signal on said first path and outputting a notch filtered optical signal to a first detector to provide a first electrical signal indicating an optical noise power of said notch filtered optical signal;

in said second path, a second detector receiving a second optical signal on said second path to provide a second electrical signal indicating an optical channel and noise power of the said second optical signal; and a processor operative to control said apparatus for each of said plurality of channels to:
  i. tune the center frequency of said tunable bandpass filter for measurement of signal power of a selected channel;
  ii. receive said first electrical signal and said second electrical signal; and
  iii. calculate an OSNR based on said first and second electrical signals.

25. The apparatus of claim 24 wherein said cascaded narrow-band notch filter is implemented by a cascaded Fibre-Bragg diffraction grating.

26. The apparatus of claim 24 wherein the response of each of said cascaded narrow-band notch filters and the shape of said optical signal spectrum of the corresponding signal channel are approximately inverse.

27. The apparatus of claim 24 wherein said first detector is a high gain circuit and said second detector is a low gain circuit.

28. The apparatus of claim 24 further comprising an isolator coupled to the input of said tunable bandpass filter to prevent reflections.

* * * * *

UNITED STATES PATENT AND TRADEMARK OFFICE
CERTIFICATE OF CORRECTION

PATENT NO. : 6,396,051 B1  Page 1 of 1
DATED : May 28, 2002
INVENTOR(S) : Jinghui Li et al.

It is certified that error appears in the above-identified patent and that said Letters Patent is hereby corrected as shown below:

<u>Column 11,</u>
Lines 38-43, reads:

"v.  set said switch to direct said optical bandpassed signal to said second detector; vi. receive said optical power measurement from said second detector; and vii. calculate an OSNR from said signal power and noise power measurements received from said first and second detectors."

should read as follows:

-- v.  set said switch to direct said optical bandpassed signal to said second detector;
 vi.  receive said optical power measurement from said second detector; and
 vii.  calculate an OSNR from said signal power and noise power measurements received from said first and second detectors. -- and

<u>Column 12,</u>
Line 44, "claim 18" should read -- claim 19 --.

Signed and Sealed this

Thirteenth Day of May, 2003

JAMES E. ROGAN
*Director of the United States Patent and Trademark Office*